United States Patent Office 3,261,844
Patented July 19, 1966

3,261,844
PYRAZOLYL, TRIAZOLYL AND TETRAZOLYL DERIVATIVES OF GROUP III–A ELEMENTS AND THEIR COMPOUNDS WITH METALS AND PREPARATION THEREOF
Swiatoslaw Trofimenko, Philadelphia, Pa., assignor to E. I. du Pont de Nemours and Company, Wilmington, Del., a corporation of Delaware
No Drawing. Filed Aug. 5, 1964, Ser. No. 387,559
20 Claims. (Cl. 260—299)

This invention is concerned with a new class of organo-inorganic acids, their salts and with methods for their preparation. The organo-inorganic cations of these compounds chelate strongly with divalent transition metal cations.

The compounds of the invention may be defined by Formula I:

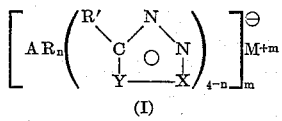

(I)

in which A is an element of Group III–A of the Periodic Table, i.e., boron, aluminum, gallium, indium, or thallium, particularly boron or aluminum; R may be hydrogen, alkyl (particularly alkyl, cycloalkyl and aralkyl of 18 carbon atoms or less), aryl (particularly aryl and alkaryl of 18 carbon atoms or less), or cyano, with R preferably being hydrogen, alkyl and aryl defined as above or cyano; X may be N or C—R''; Y may be N or C—R'''; R', R'' and R''' may be hydrogen, hydroxy, mercapto, cyano, nitro, nitroso, carboxy, alkyl (particularly alkyl, cycloalkyl and aralkyl of 18 carbon atoms or less), aryl (particularly aryl and alkaryl of 18 carbon atoms or less), halogen (i.e., —Cl, —Br, — I, —F), perhaloalkyl (with alkyl defined as above), amino (including amino substituted with one to two alkyl or aryl groups defined as above), carbacyl (including alkylcarbonyl and arylcarbonyl with alkyl and aryl defined as above), formyl, loweralkoxy, loweralkoxycarbonyl, loweralkylmercapto, hydroxyloweralkyl, aminoloweralkyl or carboxyloweralkyl; or any two of R', R'' or R''' on adjacent carbon atoms taken together may form, with the two carbons to which they are attached, a benzo or naphtho system on the pyrazole or triazole to which they are attached; $n$ may be zero, 1 or 2; $m$ is equal to the net positive charge on M, i.e., 1 or 2; M is a cation, particularly hydrogen or an ammonium, alkylammonium, arylammonium (with alkyl and aryl defined as above), sulfonium or metal ion, said metal ion having a net positive valence of 1 or 2.

In the above definition all alkyl terms are to be construed as including a preference for lower alkyl, and lower alkyl is to be understood as containing 8 or fewer carbon atoms. Amino includes disubstituted amino in which the nitrogen is a member of a 5 or 6-membered heterocyclic ring, i.e., pyrroyl and pyridyl, as well as those disubstituted amino groups described above.

The term metal is inclusive all known metals, i.e., elements of atomic numbers 3, 4, 11–13, 19–32, 37–51, 55–84, 87–103 and above. Preferred metals include Li, Be, Na, Mg, K, Ca, V, Cr, Mn, Fe, Co, Ni, Cu, Zn, Rb, Sr, Mo, Ru, Rh, Pd, Ag, Cd, Sn, Cs, Ba, Sm, Eu, Tm, Yb, W, Re, Os, Ir, Pt, Au, Hg, Pb, Po, Fr and Ra.

The definition of M above includes metal-containing cations in which the metal has a formal valence of 2 or more, but wherein this formal valence is partially satisfied by an inorganic anion so that the net valence on M is 1 or 2. Such inorganic anions, in addition to chloride illustrated in Example I, include fluoride, bromide, iodide, sulfate, nitrate, borate, carbonate, cyanide, molybdate, phosphate, silicate and thiosulfate. Particularly preferred inorganic anions are chloride and sulfate.

The products of this invention may be prepared by alternative processes. In the most general process, a compound, $MAR_4$, is heated with selected pyrazole, triazole or tetrazole, M, A and R being defined as above. The process takes place stepwise, the successive steps occurring at successively higher temperatures as shown in the following three equations:

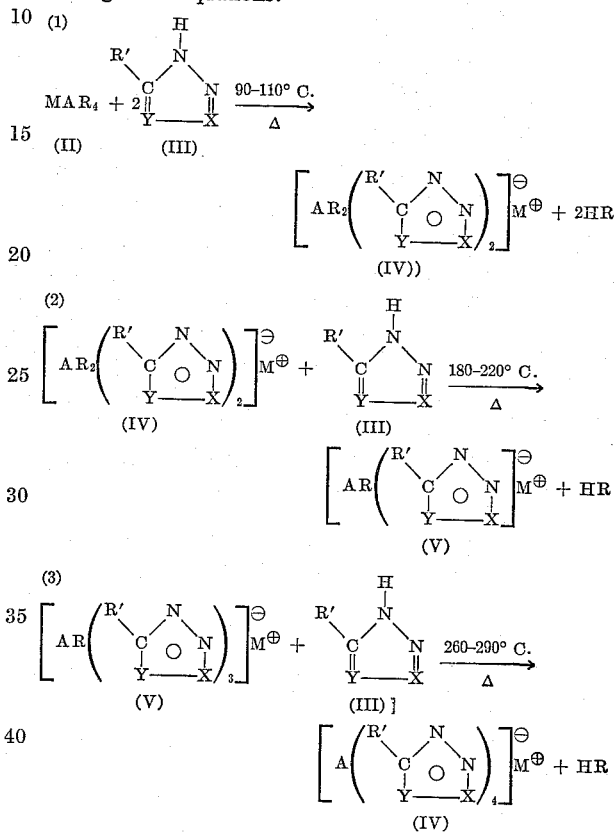

The above stepwise process of preparation is particularly suitable when M is an alkali metal (i.e., Li, Na, K, Rb, Cs, or Fr), A is boron, aluminum, or gallium, and R is hydrogen. The preparation of corresponding salts in which M is a metal other than an alkali metal is carried out by metathesis as illustrated in Examples I–VI, VIII–XIV, XVI, XIX–XXIII, and XXVII–XXX.

Another process for preparing the products of this invention involves the reaction of a compound $AR_3$ with a pyrazole, triazole, or tetrazole as indicated in the following equation wherein all symbols used are defined as above. The products of Formula I are prepared by subsequent methathesis. This process is illustrated in Example I.

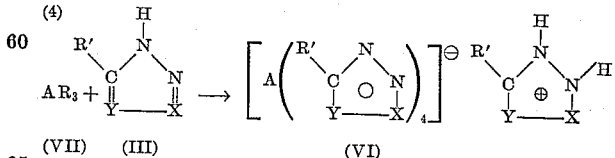

The compounds of this invention as defined in Formula I include free acids (i.e., where M is hydrogen), onium salts (i.e., where M is an ammonium, substituted ammonium or sulfonium cation), alkali metal salts where M is an alkali metal, alkaline earth metal salts where M is an alkaline earth metal, and transition metal salts where M is a transition metal. In the latter group, particularly preferred transition metals are those of Groups I–B, II–B, IV–A, V–B, VI–B, VII–B, and VIII of the Deming Periodic Table.

All of the compounds of Formula I possess marked stability against decomposition by water. This is in strong contrast to the related tetrahydroborates and tetraphenylborates which are readily decomposed by water, particularly in aqueous solutions of transition metal salts.

The free acids, onium salts, and alkali metal salts of Formula I are highly ionized in aqueous solutions and are useful as sequestering agents for heavy metals and as corrosion inhibitors.

The alkaline earth metal salts and the transition metal salts of Formula I are substantially water insoluble, can be readily purified by sublimation without decomposition, and are characterized by being soluble in organic solvents such as chloroform, methylene chloride, phenol, ethyl acetate, hexane, dioxane, and tetrahydrofuran. These organic-soluble salts are useful as antiknock agents in gasoline.

The salts most soluble in organic solvents are those in which M is a transition metal. The transition metal salts are a particularly preferred group of the compounds of Formula I since they are strongly chelated. The chelation in these compounds occurs primarily in six-membered rings of the types

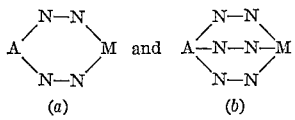

in which A and M are defined as above and the N—N structures are the N—N portions of five-membered rings derived from compounds of Formula III as indicated in Equations 1, 2, 3, and 4. These chelate rings are highly unusual in that the rings contain no carbon atom. The strong chelation accounts for the high-temperature stability of these compounds as reflected in their ability to be sublimed without decomposition. Compounds in which M is a transition metal of valence 2 contain at least two of these chelate rings. Ring structures of type (b) are most unusual in that they have a symmetrical three-dimensional cage structure in which the three auxiliary rings represented by the N—N fragments are spectroscopically equivalent.

A particularly preferred group of the compounds of Formula I are those in which A is boron or aluminum and M is a transition metal. Of these compounds, the strongest chelates are those in which A is boron.

The following examples, in which parts are by weight, describe various embodiments of the invention in greater detail. It is to be understood that these embodiments do not comprise the entire invention, but rather are intended to be illustrative of a broader inventive concept for which protection by the patent laws is being sought. The invention in its broader context finds supporting disclosure throughout the entire specification, not in the examples alone.

EXAMPLE I

Pyrazole (34 parts) is dissolved in 264 parts of benzene. The solution is stirred and boron trichloride is bubbled in until a viscous syrup separates. The benzene layer is removed by decantation, and the remaining syrup (containing pyrozolonium tetra-1-pyrozolylborate) is dissolved in 150 parts of water. A concentrated aqueous solution of ferric chloride is added and a deep red slurry forms. The mixture is extracted with methylene chloride. The organic layer is separated, dried over magnesium sulfate, and filtered. Hexane is added until the product precipitates. The precipitate is separated and dried to obtain 15 parts of the dimer of (tetra-1-pyrazolylborate) iron (III) dichloride in the form of blood-red needles, melting point 320° C. $B^{11}$ NMR: Singlet at 1420 cycles downfield from methyl borate.

*Anal.*—Calcd. for $C_{12}H_{12}N_8BFeCl_2$: C, 35.6; H, 2.96; B, 2.68; Fe, 13.8; Cl, 17.5; N, 27.6; M.W., 406 (812 for dimer). Found: C, 36.2; H, 3.14; B, 2.69; Fe, 13.7; Cl, 21.1; N, 25.7; M.W., 810, 855.

EXAMPLE II

Part A

A syrup containing pyrazolonium tetra-1-pyrazolylborate is prepared and dissolved in water as described in Example I. The resulting aqueous solution is divided into four equal parts.

Part B

One part of the solution prepared in Part A is treated with a slight chemical excess of ferrous ion in the form of an aqueous solution of ferrous ammonium sulfate. The wine-red precipitate which forms is collected by filtration and dried to obtain bis(tetra-1-pyrazolylborate)iron (II). After recrystallization from dimethylformamide, this product is purified by sublimation; melting point 337–345° C.

*Anal.*—Calcd. for $C_{24}H_{24}N_{16}B_2Fe$: C, 46.9; H, 3.91; Fe, 9.12; N, 36.5; B, 3.52; M.W., 614. Found: C, 47.1; H, 4.04; Fe, 9.05; N, 35.9; B, 3.75; M.W., 638, 688.

Part C

The procedure of Part B is repeated except for using cupric acetate in place of ferrous ammonium sulfate. The product is bis(tetra-1-pyrozolylborate)copper (II) which is purified by sublimation.

Part D

The procedure of Part B is repeated except for using $Ni(OAc)_2$ in place of ferrous ammonium sulfate. The product is bis(tetra-1-pyrazolylborate)nickel (II) which is readily purified by sublimation.

Part E

The procedure of Part B is repeated except for using $Co(OAc)_2$ in place of ferrous ammonium sulfate. The product is bis(tetra-1-pyrazolylborate)cobalt (II) which is readily purified by sublimation.

EXAMPLE III

Part A

An aqueous solution containing the tetra-1-pyrazolylborate ion is prepared by the procedure of Part A of Example II starting with 1360 parts of pyrazole.

Part B

A portion (26.5%) of the solution prepared in Part A is treated with a molecular excess of aqueous $Ni(OAc)_2$. A pale lilac-colored solid precipitates. It is recrystallized from dimethylformamide to obtain 43 parts of bis(tetra-1-pyrazolylborate)nickel (II), melting point 356–360° C.

*Anal.*—Calcd. for $C_{24}H_{24}N_{16}B_2Ni$: C, 46.7; H, 3.89; Ni, 9.49. Found: C, 47.2; H, 4.08; Ni, 9.48.

Part C

Another portion of the aqueous solution prepared in Part A (14.7%) is treated with a molecular excess of aqueous cobaltous chloride. A yellow solid precipitates. It is separated by filtration, dried, and recrystallized from dimethylformamide to obtain 38 parts of bis(tetra-1-pyrazolylborate)cobalt (III), melting point 347–350° C.

*Anal.*—Calcd. for $C_{24}H_{24}N_{16}B_2Co$: C, 46.8; H, 3.89; Co, 9.57; N, 36.3; B, 3.50; M.W., 617. Found: C, 46.8; H, 4.01; Co, 9.59; N, 36.4; B, 4.11; M.W., 599.

Part D

Another portion of the solution prepared in Part A (14.7%) is treated with a molecular excess of aqueous $Cu(OAc)_2$. A blue solid precipitates. It is recrystallized from dimethylformamide to obtain 43 parts of bis-(tetra-1-pyrazolylborate)copper (II), melting point 270–275° C.

*Anal.*—Calcd. for $C_{24}H_{24}N_{16}B_2Cu$: C, 46.3; H, 3.86; Cu, 10.2. Found: C, 46.6; H, 3.95; Cu, 10.3.

EXAMPLE IV

A mixture of pyrazole and potassium borohydride ($KBH_4$) is heated until molten. Hydrogen is evolved, and the resulting melt eventually refluxes at 220° C. The melt contains potassium hydrotri-1-pyrazolylborate. It is cooled, dissolved in water, and treated with aqueous $Ni(OAc)_2$. The resulting precipitate of bis(hydrotri-1-pyrazolylborate) nickel (II) is separated and dried. The presence of a B—H bond is confirmed by infrared analysis. The product is more soluble in methylene chloride than bis(tetra-1-pyrazolylborate)nickel (II) as prepared in Example III, Part B.

EXAMPLE V

Part A

To a melt of 680 parts of pyrazole is added 108 parts of $KBH_4$. The melt is heated gradually so that hydrogen evolves smoothly. After about 12.1 parts of hydrogen has evolved, the melt reaches a temperature of 210° C. and heating is discontinued. The cooled product is dissolved in 5000 parts of water and the resulting solution is divided into five equal parts.

Part B

To one part of the solution prepared in Part A is added a slight molecular excess of $Ni(OAc)_2$. The precipitate which forms is extracted with methylene chloride. The organic solution is dried over anhydrous magnesium sulfate and evaporated to dryness. The resulting solid is recrystallized from dimethylformamide and further purified by sublimation to obtain 59 parts of bis(hydrotri-1-pyrazolylborate)nickel (II) in the form of pale lilac crystals melting at 280–282° C.

*Anal.*—Calcd. for $C_{18}H_{20}N_{12}B_2Ni$: C, 44.6; H, 4.13; Ni, 12.1. Found: C, 44.6; H, 3.92; Ni, 11.9.

Part C

The procedure of Part B is repeated except that in place of $Ni(OAc)_2$ a solution of $CoCl_2$ is employed. This yields 65 parts of bis(hydrotri-1-pyrazolylborate)-cobalt (II) in the form of yellow crystals melting at 277–278° C.

*Anal.*—Calcd. for $C_{18}H_{20}N_{12}B_2Co$: C, 44.6; H, 4.13; Co, 12.2. Found: C, 44.8; H, 4.21; Co 12.0.

Part D

The procedure of Part B is repeated except that an aqueous solution of $FeSO_4$ is used. This yields 60 parts of bis(hydrotri-1-pyrazolylborate)iron (II) in the form of wine-red crystals melting with decomoposition at 265–269° C.

*Anal.*—Calcd. for $C_{18}H_{20}N_{12}B_2Fe$: C, 44.9; H, 4.16; Fe, 11.6. Found: C, 45.2; H, 4.24; Fe, 11.7.

Part E

The procedure of Part B is repeated except that aqueous $Cu(OAc)_2$ is used. This yields blue crystals of bis-(hydrotri-1-pyrazolylborate)copper (II) melting at 245–247° C.

*Anal.*—Calcd. for $C_{18}H_{20}N_{12}B_2Cu$: C, 44.2; H, 4.08; Cu, 13.0. Found: C, 44.2; H, 4.18; Cu, 13.8.

EXAMPLE VI

Part A

A mixture of 1360 parts of pyrazole and 360 parts of $KBH_4$ is stirred and heated at 90–120° C. until about 27 parts of hydrogen evolves. The remaining melt is solidified by cooling and dissolved in 13,300 parts of water.

Part B

A portion of the aqueous solution prepared in Part A is treated with a slight molecular excess of aqeuous $Ni(OAc)_2$. The precipitate which forms is separated and dried to obtain bis(dihydrodi-1-pyrazolylborate)-nickel (II) in the form of orange crystals which on infrared spectral analysis exhibit a multipeak pattern in the range of 4–4.5μ (B—H).

Part C

The procedure of Part B is repeated except for using aqueous $CoCl_2$ in place of $Ni(OAc)_2$. The product consists of purple crystals of bis(dihydrodi-1-pyrazolylborate)cobalt (II) melting at 163–164° C. The product exhibits a multipeak pattern in the 4–4.5μ region on infrared analysis.

Part D

The procedure of Part B is repeated except that aqueous $Cu(OAc)_2$ is used. There is obtained bis(dihydrodi-1-pyrazolylborate)copper (II) in the form of violet crystals. On infrared analysis, these exhibit a multipeak pattern in the region of 4–4.5μ.

Part E

The procedure of Part B is repeated except that aqueous $MnSO_4$ is employed. The product is bis(dihydrodi-1-pyrazolylborate) manganese (II). On infrared analysis it exhibits a multipeak pattern in the region of 4–4.5μ.

EXAMPLE VII

A mixture of 136 parts of pyrazole and 27 parts of $KBH_4$ is heated to melting and stirred. About three parts of hydrogen is evolved as the melt temperature rises to 220° C. Thereafter the evolution of hydrogen continues slowly and the temperature of the melt rises to 309° C. The resulting melt is solidified by cooling, broken up, and dissolved in 1000 parts of boiling water. The hot solution is treated with decolorizing charcoal, filtered, and then cooled. The resulting precipitate is separated by filtration and dried at 100° C./20 mm. to obtain 41 parts of potassium tetra-1-pyrazolylborate monohydrate.

*Anal.*—Calcd. for $C_{12}H_{12}N_8BK \cdot H_2O$: C, 42.9; H, 4.17; N, 33.4; K, 11.6 Found: C, 43.3; H, 4.42; N, 33.4; K, 10.4.

EXAMPLE VIII

A mixture of 1360 parts of pyrazole and 270 parts of $KBH_4$ is heated until a reflux temperature of 215° C. is reached and a total of about 34.3 parts of hydrogen has evolved. The resulting product is cooled and dissolved in 10,000 parts of water. One fifth of this solution is treated with a slight molecular excess of aqueous $MnSO_4$. The precipitate which forms is separated by filtration and dried to obtain 151 parts of bis(hydrotri-1-pyrazolylborate)manganese (II). It is purified by recrystallization from dimethylformamide and sublimation at 250° C./1 mm.

*Anal.*—Calcd. for $C_{18}H_{20}N_{12}B_2Mn$: C, 44.9; H, 4.17; Mn, 11.4; M.W., 481. Found: C, 45.1; H, 4.33; Mn, 10.9; M.W. 496.

EXAMPLE IX

Three parts of potassium tetra-1-pyrazolylborate monohydrate, prepared as in Example VII, is dissolved in 100 parts of water. The solution is neutralized with acetic acid. About five parts of 0.1 M aqueous $Li_2PdCl_4$ is added. The precipitate which forms is extracted with methylene chloride. The extract is evaporated to dryness and the residue purified by sublimation at 310° C./1 mm. to obtain bis(tetra-1-pyrazolylborate)palladium (II) in the form of colorless crystals.

*Anal.*—Calcd. for $C_{24}H_{24}N_{16}B_2Pd$: C, 43.4; H, 3.62. Found: C, 43.8; H, 3.81.

EXAMPLE X

A mixture of 68 parts of pyrazole and 18 parts of $KBH_4$ is heated and stirred until all the $KBH_4$ is dissolved and about 1.2 parts of hydrogen has evolved. The product is cooled and dissolved in 100 parts of water. There is added about 330 parts of 0.5 M Ni(OAc)₂. The solid which precipitates is extracted with methylene chloride. The extracts are dried and chromatographed rapidly on alumina. The orange band is collected, the solvent is evaporated, and the residue recrystallized from benzene to obtain 24 parts of bis(dihydrodi-1-pyrazolylborate)nickel (II) in the form of red crystals which darken at 166° C. and decompose at 180–182° C.

*Anal.*—Calcd. for $C_{12}H_{16}N_8B_2Ni$: C, 40.8; H, 4.54; Ni, 16.7; M.W., 352. Found: C, 41.5; H, 4.82; Ni, 16.7; M.W., 337.

EXAMPLE XI

Part A

A mixture of 148 parts of 4-chloropyrazole and 19 parts of $KBH_4$ is heated as a melt until about 2.5 parts of hydrogen has evolved. The reaction mixture, containing potassium hydrotris(4-chloropyrazol-1-yl)borate is cooled and dissolved in 1000 parts of water. The resulting solution is divided into five equal portions.

Part B

One portion of the solution prepared in Part A is treated with a slight molecular excess of aqueous $MnSO_4$. The precipitate which forms is extracted with methylene chloride. The organic layer is separated and evaporated to dryness to obtain 15.4 parts of bis[hydrotris(4-chloropyrazol-1-yl)borate]manganese (II). This product is recrystallized from dimethylformamide and then from chlorobenzene to obtain colorless crystals melting with decomposition starting at 430° C.

Part C

The procedure of Part B is repeated except that aqueous ferrous ammonium sulfate is employed in place of $MnSO_4$. There is obtained 9.7 parts of bis[hydrotris(4-chloropyrazol-1-yl)borate]iron (II). It is recrystallized as in Part B to yield wine-red crystals which melt with decomposition starting at 430° C.

Part D

The procedure of Part B is repeated except that aqueous cobaltous chloride is employed. There is obtained 14 parts of bis[hydrotris(4-chloropyrazol-1-yl)borate]cobalt (II). It is recrystallized as in Part B to yield yellow crystals which melt with decomposition starting at 410° C.

Part E

The procedure of Part B is repeated except that aqueous Ni(OAc)₂ is employed. There is obtained 10.3 parts of bis [hydrotris(4-chloropyrazol-1-yl)borate]nickel (II). It is recrystallized as in Part B to yield lilac crystals which melt with decomposition starting at 440° C.

Part F

The procedure of Part B is repeated except that aqueous cupric acetate is employed. There is obtained 7.5 parts of bis[hydrotris(4-chloropyrazol-1-yl)borate]copper. It is recrystallized as in Part B to obtain blue crystals which melt with decomposition starting at 320° C.

EXAMPLE XII

A solution of 33 parts of $K_2PtCl_4$ in 1500 parts of water is treated with about 3200 parts of 0.05 M aqueous potassium tetra-1-pyrazolylborate. The solution is heated to boiling, and the precipitate which forms is separated by filtration, washed first with water and then with ethanol, and then dried to yield 27 parts of bis(tetra-1-pyrazolylborate)platinum (II) in the form of essentially colorless crystals.

EXAMPLE XIII

A mixture of 740 parts of 3-methylpyrazole and 122 parts of $KBH_4$ is heated to drive off hydrogen. The resulting melt contains potassium hydrotris(3(5)-methylpyrazol-1-yl) borate and potassium tetrakis(3(5)-methylpyrazol-1-yl)borate. It is cooled and dissolved in water. The resulting aqueous solution is divided into four equal parts. The parts are treated, respectively, with slight molecular excesses of aqueous solutions of ferrous ammonium sulfate, cobaltous chloride, nickelous acetate, and cupric acetate. The precipitates which form are extracted with methylene chloride. The extracts are purified by chromatography on alumina and then dried to yield, respectively, red crystals of bis[hydrotris(3(5)-methylpyrazol-1-yl)borate]iron (II) and bis[tetrakis(3(5)-methylpyrazol-1-yl)borate]iron (II); yellow crystals of bis[hydrotris(3(5)-methylpyrazol-1-yl)borate] cobalt (II) and bis[tetrakis(3(5)-methylpyrazol-1-yl)borate]cobalt (II); lilac crystals of bis[hydrotris(3(5)-methylpyrazol-1-yl)borate]nickel (II) and bis[tetrakis(3(5)-methylpyrazol-1-yl)borate]nickel (II); and blue crystals of bis[hydrotris(3(5)-methylpyrazol-1-yl)borate] copper (II) and bis[tetrakis(3(5)-methylpyrazol-1-yl)borate]copper (II).

EXAMPLE XIV

Part A

A mixture of 480 parts of 3,5-dimethylpyrazole and 67.5 parts of $KBH_4$ is heated gradually to 250° C. until about 8.3 parts of hydrogen is evolved. The melt is cooled and dissolved in 6500 parts of water. The solution is neutralized with acetic acid using the end-point where phenolphthalein changes from red to colorless. The solid which separates is removed by filtration. The filtrate is divided into two equal parts.

Part B

One half of the filtrate from Part A is treated with a slight molecular excess of aqueous nickelous acetate. The precipitate which forms is extracted with methylene chloride and recovered from the organic solution by evaporation to obtain 11 parts of bis[hydrotris(3,5-dimethylpyrazol-1-yl)borate]nickel (II) in the form of pale lilac crystals.

Part C

The procedure of Part B is repeated except for using cobaltous chloride in place of nickelous acetate. There is obtained 6.4 parts of bis[hydrotris(3,5-dimethylpyrazol-1-yl)borate]cobalt (II) in the form of yellow crystals.

*Anal.*—Calcd. for $C_{30}H_{44}N_{12}B_2Co$: C, 55.1; H, 6.74; Co, 9.01. Found: C, 55.9; H, 6.87; Co, 9.04.

EXAMPLE XV

A mixture of 54 parts of $KBH_4$ and 272 parts of pyrazole is heated together until about 6.7 parts of hydrogen is evolved. The melt is decanted into 433 parts of toluene with stirring. The mixture is cooled, filtered, and the residue is washed twice with 130-part portions of toluene at 80° C. The residue is air-dried to obtain 190 parts of potassium hydrotri-1-pyrazolylborate in the form of colorless crystals melting at 185–190° C.

EXAMPLE XVI

Part A

A mixture of 520 parts of 4-isopropylpyrazole (prepared by treatment of isopropylmalonaldehyde with hydrazine) and 93 parts of $KBH_4$ is heated until the melt reaches 310° C. The melt is cooled to 170° C., poured onto ice, and dissolved by the gradual addition of 20% hydrochloric acid. The resulting solution is divided into four parts.

Part B

One part of the solution prepared in Part A is treated with 2000 parts of 0.5 M ferrous ammonium sulfate. The solid which precipitates is extracted with methylene chloride. The organic solution is dried, filtered, and evaporated to dryness to obtain 30 parts of bis[hydrotris-(4-isopropylpyrazol-1-yl)borate]iron (II) in the form of wine-red crystals.

*Part C*

The procedure of Part B is repeated except for using 0.5 M $CoCl_2$ in place of ferrous ammonium sulfate. There is obtained 60 parts of bis[hydrotris(4-isopropylpyrazol-1-yl)borate]cobalt (II) in the form of yellow crystals. These are purified by recrystallization from a mixture of ethyl acetate, ether, and hexane and further purified by sublimation.

*Anal.*—Calcd. for $C_{36}H_{56}N_{12}B_2Co$: C, 58.7; H, 7.62; Co, 8.00. Found: C, 58.6; H, 7.75; Co, 8.00.

*Part D*

The procedure of Part B is repeated except that aqueous $Ni(OAc)_2$ is employed. There is obtained 42 parts of bis[hydrotris(4-isopropylpyrazol-1-yl)borate]nickel (II) in the form of lilac-colored crystals. They are purified by recrystallization from a mixture of ethyl acetate, ether, and hexane and further purified by sublimation.

*Anal.*—Calcd. for $C_{36}H_{56}N_{12}B_2Ni$: C, 58.7; H, 7.62; Ni, 7.99. Found: C, 59.4; H, 8.11; Ni, 8.05.

*Part E*

The procedure of Part B is repeated except that aqueous cupric acetate is employed. There is obtained 24 parts of bis[hydrotris(4-isopropylpyrazol-1-yl)borate]copper (II) in the form of blue crystals.

EXAMPLE XVII

A solution of 38 parts of $LiAlH_4$ in 1784 parts of ether is added slowly to a solution of 340 parts of pyrazole in 1784 parts of ether under an atmosphere of nitrogen. About 8 parts of hydrogen is evolved. The resulting solution is evaporated to dryness to yield lithium tetra-1-pyrazolylaluminate in the form of a white solid.

EXAMPLE XVIII

A mixture of 54 parts of $KBH_4$ and 272 parts of pyrazole is heated together at temperatures not exceeding 115° C. until about 4.5 parts of hydrogen is evolved. The melt is decanted into 433 parts of toluene with stirring. The mixture is cooled, filtered, and the solid is washed two times with 130-part portions of toluene at 80° C. The residue is air-dried to obtain 137 parts of potassium dihydrodi-1-pyrazolylborate in the form of colorless crystals melting at 171–172° C. The product shows infrared absorption in the range of 2250–2420 cm.$^{-1}$

*Anal.*—Calcd. for $C_6H_8N_4BK$: C, 38.7; H, 4.30; N, 30.1. Found: C, 39.4; H, 4.51; N, 29.9.

EXAMPLE XIX

To a solution of 420 parts of potassium dihydrodi-1-pyrazolylborate in 8000 parts of water is added 1070 parts of ether. The mixture is carefully neutralized with dilute hydrochloric acid. There is a vigorous evolution of hydrogen. When gas evolution subsides, about 500 parts of 0.5 M $CuSO_4$ is added. At first a precipitate forms, then there is a violent gas evolution which is controlled by pouring ether on top of the mixture. Another 1500 parts of $CuSO_4$ solution is added, and the mixture is extracted with ether. Extracts are chromatographed on alumina. Impurities are first eluted with ether and then the product is eluted with methylene chloride. This latter solution is evaporated to dryness to obtain 129 parts of bis(dihydrodi-1-pyrazolylborate)copper (II) in the form of purplish-blue crystals melting at 134–135° C.

*Anal.*—Calcd. for $C_{12}H_{16}N_8B_2Cu$: C, 40.3; H, 4.48; Cu, 17.8; N, 31.4; M.W., 357. Found: C, 40.6; H, 4.77; Cu, 17.7; N, 31.0; M.W., 367.

EXAMPLE XX

An aqueous solution of potassium tetra-1-pyrazolylborate is treated with an aqueous solution of lead nitrate. The precipitate which forms is separated and dried to yield bis(tetra-1-pyrazolylborate)lead (II) in the form of colorless crystals. They are purified by sublimation.

EXAMPLE XXI

An aqueous solution of potassium tetra-1-pyrazolylborate is treated with an aqueous solution of calcium chloride. The precipitate which forms is separated and dried to yield bis(tetra-1-pyrazolylborate)calcium (II) in the form of colorless crystals. They are purified by sublimation.

EXAMPLE XXII

*Part A*

A mixture of 2880 parts of 3,5-dimethylpyrazole and 361 parts of $KBH_4$ is heated until about 46 parts of hydrogen has evolved. The reaction mixture is cooled and dissolved in 15,000 parts of water. The solution is extracted six times with ether to remove excess 3,5-dimethylpyrazole. The resulting solution is divided into six equal parts.

*Part B*

One portion of the aqueous solution prepared in Part A is treated with 1500 parts of 0.5 M $FeSO_4$. The solid which precipitates is extracted with methylene chloride, and the resulting organic solution is evaporated to dryness to obtain 125 parts of bis[hydrotris(3,5-dimethylpyrazole-1-yl)borate]iron (II) in the form of pale green crystals. They are purified by chromatography on alumina and further purified by vacuum sublimation. The melting point is 385° C.

*Anal.*—Calcd. for $C_{30}H_{44}N_{12}B_2Fe$: C, 55.4; H, 6.77; Fe, 8.60. Found: C, 56.6; H, 7.19; Fe, 8.62.

*Part C*

The procedure of Part B is repeated except that nickelous acetate is used in place of ferrous sulfate. There is obtained 70 parts of bis[hydrotris(3,5-dimethylpyrazol-1-yl)borate]nickel (II) in the form of lilac crystals. These are purified by chromatography and vacuum sublimation as in Part B, melting point 406–410° C. with decomposition.

*Anal.*—Calcd. for $C_{30}H_{44}N_{12}B_2Ni$: C, 55.2; H, 6.74; Ni, 8.97. Found: C, 56.7; H, 6.95; Ni, 8.89.

*Part D*

The procedure of Part B is repeated except that cobaltous chloride is used in place of ferrous sulfate. There is obtained 80 parts of bis[hydrotris(3,5-dimethylpyrazol-1-yl)borate]cobalt (II) in the form of yellow crystals melting at 397–402° C. They are purified as in Part B.

*Anal.*—Calcd. for $C_{30}H_{44}N_{12}B_2Co$: C, 55.2; H, 6.74; Co, 9.01. Found: C, 55.9; H, 6.87; Co, 9.04.

*Parts E and F*

The procedure of Part B is repeated except that cupric sulfate and manganous sulfate are used in place of ferrous sulfate to give, respectively, 200 parts of bis[hydrotris(3,5-dimethylpyrazol-1-yl)borate]copper (II) as blue crystals and 78 parts of bis[hydrotris(3,5-dimethylpyrazol-1-yl)borate]manganese (II) as colorless crystals. Each product is purified as in Part B.

EXAMPLE XXIII

*Part A*

To a solution of 580 parts of 3,5-dimethylpyrazole in 3778 parts of dimethylformamide is added 108 parts of $KBH_4$. The mixture is refluxed until about 13.5 parts of impure hydrogen is evolved. The hydrogen contains some by-product dimethylamine. The resulting solution containing potassium dihydrobis(3,5-dimethylpyrazol-1-yl)borate is divided into five equal portions.

Part B

To one portion of the solution prepared as in Part A is added a slight molecular excess of 0.5 M $MnSO_4$. The solid which precipitates is collected by filtration and extracted with methylene chloride. Evaporation of the methylene chloride yields 54 parts of bis[dihydrobis(3,5-dimethylpyrazol-1-yl)borate]manganese (II) in the form of colorless crystals. They are recrystallized from cyclohexane, melting point 191–192° C.

*Anal.*—Calcd. for $C_{20}H_{32}N_8B_2Mn$: C, 52.2; H, 6.96; Mn, 11.9; M.W, 461. Found: C, 52.3; H, 7.20; Mn, 12.0; M.W., 496.

Part C

The procedure of Part B is repeated except that ferrous sulfate is used in place of manganous sulfate. There is obtained 31 parts of bis[dihydrobis(3,5-dimethylpyrazol-1-yl)borate]iron (II) in the form of wine-red crystals. After two recrystallizations from cyclohexane, the melting point is 217–220° C.

*Anal.*—Calcd. for $C_{20}H_{32}N_8B_2Fe$: C, 52.1; H, 6.94; Fe 12.1; M.W., 462. Found: C, 52.5; H, 7.21; Fe, 12.0; M.W., 451.

Part D

The procedure of Part B is repeated except that cobaltous chloride is employed. The product is recrystallized from cyclohexane to yield 21 parts of bis[dihydrobis(3,5-dimethylpyrazol-1-yl)borate]cobalt (II) in the form of purple crystals melting at 225–227° C.

*Anal.*—Calcd. for $C_{20}H_{32}N_8B_2Co$: C, 51.7; H, 6.88; Co, 12.6. Found: C, 52.3; H, 7.34; Co, 12.4.

Part E

The procedure of Part B is repeated except that nickelous acetate is used in place of manganous sulfate. The product is purified by sublimation to obtain five parts of bis[dihydrobis(3,5-dimethylpyrazol-1-yl)borate]nickel (II) in the form of orange crystals which melt with decomposition at about 260° C.

*Anal.*—Calcd. for $C_{20}H_{32}N_8B_2Ni$: C, 51.7; H, 6.88; Ni, 12.6. Found: C, 52.3; H, 6.98; Ni, 12.2.

EXAMPLE XXIV

A mixture of 176 parts of bis(dihydrodi-1-pyrazolylborate)nickel (II) and 100 parts of 4-cyanopyrazole is heated until the mixture turns dark violet in color and hydrogen is evolved. The reaction mixture is cooled, and the resulting solid is dissolved in methylene chloride and chromatographed on alumina. On evaporation, there is obtained 89 parts of bis[hydro(4-cyanopyrazol-1-yl)di-1-pyrazolylborate]nickel (II) in the form of purple crystals. Infrared analysis shows the presence of both B—H and CN bands.

EXAMPLE XXV

A mixture of 70 parts of bis(dihydrodi-1-pyrazolylborate)nickel (II) and 42 parts of 1,2,4-triazole is refluxed in about 1030 parts of xylene for three days. The mixture is cooled and filtered, and the solid residue is purified by sublimation to obtain 40 parts of bis[hydrodi-1-pyrazolyl(1,2,4-triazol-1-yl)borate]nickel (II) in the form of lilac-colored crystals. The product is recrystallized from chlorobenzene, melting point 366–367° C. with decomposition.

EXAMPLE XXVI

A mixture of 70 parts of bis(dihydrodi-1-pyrazolylborate)nickel (II) and 57 parts of 3,5-dimethylpyrazole is refluxed in about 1030 parts of xylene for three days. The reaction mixture is evaporated to dryness, taken up in hexane, and purified by chromatography to obtain bis-[hydro(3,5-dimethylpyrazol-1-yl)di-pyrazolylborate]nickel (II) in the form of lilac-covered crystals, melting point about 240° C.

EXAMPLE XXVII

An aqueous solution of 33 parts of the monohydrate of potassium tetra-1-pyrazolylborate is treated with a molecular excess of aqueous zinc chloride. The precipitate which forms is collected by filtration, dried and recrystallized from chlorobenzene to obtain bis(tetra-1-pyrazolylborate)zinc (II) in the form of colorless crystals melting at 322–323° C.

*Anal.*—Calcd. for $C_{24}H_{24}N_{16}B_2Zn$: C, 46.2; H, 3.85; Zn, 10.5. Found: C, 46.3; H, 3.62; Zn, 10.5.

EXAMPLE XXVIII

An aqueous solution of potassium hydrotri-1-pyrazolylborate is treated with a molecular excess of aqueous zinc chloride. The precipitate which forms is extracted with methylene chloride and chromatographed on alumina. The product is recrystallized from toluene to obtain bis-(hydrotri-1-pyrazolylborate)zinc (II) in the form of colorless crystals melting at 282–284° C.

*Anal.*—Calcd. for $C_{18}H_{20}N_{12}B_2Zn$: C, 44.0; H, 4.08; Zn, 13.3. Found: C, 44.3; H, 4.38; Zn, 13.3.

EXAMPLE XXIX

A mixture of 54 parts of $KBH_4$ and 276 parts of 1,2,4-triazole is heated until the temperature of the melt reaches 265° C. and about 7.5 parts of hydrogen is evolved. The dark mixture is cooled to solidify and dissolved in water. The resulting aqueous solution is treated with aqueous nickelous acetate. The solid which precipitates is separated and dried to obtain bis[hydrotris(1,2,4-triazol-1-yl)borate]nickel (II) in the form of pale lilac crystals.

EXAMPLE XXX

A mixture of 54 parts of $KBH_4$ and 276 parts of 1,2,3-triazole is heated until about 6.3 parts of hydrogen has evolved. The product is dissolved in water and treated with a slight molecular excess of aqueous nickelous acetate. The precipitate which forms is separated to obtain bis[hydrotris(1,2,3-triazol-1-yl)borate]nickel (II). The infrared analysis of this product shows singlet bands for B—H. By the above procedure, the corresponding compounds of iron (II), cobalt (II), and copper (II) are prepared.

EXAMPLE XXXI

Part A

A mixture of 54 parts of $KBH_4$ and 340 parts of pyrazole is stirred and heated until about 8.1 parts of hydrogen is evolved. The resulting melt is cooled and poured into 1300 parts of toluene. The mixture is stirred and filtered, and the residue is washed successively with hot toluene, benzene, and ether. There remains 310 parts of potassium tetra-1-pyrazolylborate in the form of colorless crystals.

*Anal.*—Calcd. for $C_{12}H_{12}N_8BK$: C, 45.3; H, 3.78; N, 35.2. Found: C, 43.0; H, 4.37; N, 34.0.

Part B

An aqueous solution of potassium tetra-1-pyrazolylborate is treated with a molecular equivalent amount of aqueous $Ni(OAc)_2$. The precipitate which forms is separated and purified by vacuum sublimation to obtain bis-(tetra-1-pyrazolylborate)nickel (II) in the form of lilac-colored crystals melting at 370–372° C.

*Anal.*—Calcd. for $C_{24}H_{24}N_{16}B_2Ni$: C, 46.7; H, 3.89; N, 36.3 Found: C, 47.0; H, 4.22; N, 37.4.

EXAMPLE XXXII

A mixture of 150 parts of phenylborondichloride in benzene is poured into a benzene solution of a molecular excess of pyrazole. The mixture warms spontaneously and a white solid separates. The mixture is extracted with water and the aqueous extracts are heated with a molecular excess of aqueous $Co(OAc)_2$. The resulting slurry is extracted with methylene chloride. The organic layer is evaporated to dryness and the residue recrystallized from chlorobenzene to obtain 16 parts of bis(phenyltri-1-pyrazolylborate)cobalt (II). After purification by sublimation at 300° C./1 mm., the product melts partially at about 355° C. and remains darkened but still unmelted at 430° C.

*Anal.*—Calcd. for $C_{30}H_{28}N_{12}B_2Co$: C, 56.6; H, 4.40; N, 26.4. Found: C, 55.6; H, 4.36; N, 27.4.

EXAMPLE XXXIII

Aqueous ferric sulfate is added to an aqueous solution of potassium hydrotri-1-pyrazolylborate. The red precipitate which forms is extracted with methylene chloride. The organic layer is separated and evaporated to dryness to obtain hydrotri-1-pyrazolylborate iron (III) sulfate in the form of a red solid.

EXAMPLE XXXIV

A mixture of 54 parts of $KBH_4$ and 480 parts of 3,5-dimethylpyrazole is heated with stirring at temperatures up to 238° C. until 6.75 parts of hydrogen is evolved. The melt is cooled to 200° C. and poured into 1732 parts of toluene with stirring. The resulting mixture is cooled and filtered, and the residue is air-dried to obtain 114 parts of potassium hydrotris(3,5-dimethylpyrazol-1-yl)borate in the form of colorless crystals which melt at about 300° C. and can be purified by sublimation at 290° C./1 mm.

*Anal.*—Calcd. for $C_{15}H_{22}N_6BK$: C, 53.6; H, 6.55. Found: C, 53.7; H, 6.72.

EXAMPLE XXXV

A mixture of 54 parts of $KBH_4$ and 270 parts of 1,2,4-triazole is heated together until 6.75 parts of hydrogen evolves. The melt is cooled and dissolved in 8,000 parts of water. The solution is warmed and 1,000 parts of 0.5 M $Co(OAc)_2$ solution in water is added. The precipitate which forms is collected by filtration and recrystallized from hot water to obtain 39 parts of bis[hydrotris(1,2,4-triazol-1-yl)borate]cobalt (II) in the form of yellow crystals which do not melt at temperatures up to 390° C.

*Anal.*—Calcd. for $C_{12}H_{14}N_{18}B_2Co$: C, 29.3; H, 2.85; N, 51.3. Found: C, 29.5; H, 2.93; N, 51.4.

EXAMPLE XXXVI

A solution of 180 parts of potassium tetra-1-pyrazolylborate in 3,000 parts of water is treated with 31 parts of acetic acid. The precipitate which forms is collected by filtration, washed with water and ethanol, and air-dried to obtain 115 parts of colorless crystals. This product is purified by dissolving it in a minimum amount of methylene chloride and adding a large excess of diethyl ether. The solid which separates is collected by filtration and dried to obtain hydrogen tetra-1-pyrazolylborate melting at 70–71° C.

*Anal.*—Calcd. for $C_{12}H_{13}N_8B$: C, 51.4; H, 4.64; N, 40.0. Found: C, 52.1; H, 4.69; N, 40.4.

EXAMPLE XXXVII

An aqueous solution of potassium dihydrodi-1-pyrazolylborate is acidified by adding an aqueous solution of an equivalent amount of acetic acid. The precipitate which forms is separated and dried to obtain hydrogen dihydrodi-1-pyrazolylborate in the form of colorless crystals.

EXAMPLE XXXVIII

An aqueous solution of potassium hydrotri-1-pyrazolylborate is acidified with a molecular equivalent amount of aqueous acetic acid. The precipitate which forms is separated by filtration and dried to obtain hydrogen hydroti-1-pyrazolylborate in the form of colorless crystals.

An alternative method for preparing the salts of this invention is by neutralizing the free acid products with an appropriate base, i.e., an oxide or hydroxide. For example, onium salts other than those described above may be prepared by neutralizing an aqueous solution of a free acid such as hydrogen tetra-1-pyrazolylborate of Example XXXVI with ammonium hydroxide, tetraethylammonium hydroxide, methyltriphenylammonium hydroxide, or triethylsulfonium hydroxide. The respective products which precipitate are ammonium tetra-1-pyrazolylborate, tetraethylammonium tetra-1-pyrazolylborate, methyltriphenylammonium tetra-1-pyrazolylborate and triethylsulfonium tetra-1-pyrazolylborate. Similarly by employing the free acids of Examples XXXVII and XXXVIII the corresponding onium dihydrodi-1-pyrazolylborates and onium hydroti-1-pyrazolylborates are obtained.

When the substituted pyrazoles shown in column A of Table I are used in place of 3,5-dimethylpyrazole in Parts A and C of Example XXIII, the iron chelate salt shown in column B is obtained. When the same substituted pyrazoles are used in place of 3,5-dimethylpyrazole in Parts A and E of Example XXII, the cobalt chelate salts in column C are obtained. When the same substituted pyrazoles are used in place of pyrazole in Parts A and B of Example XXXI, the nickel chelate salts shown in column D are obtained.

TABLE I

| Item | A. Substituted Pyrazole | B. Product from Procedure of Example XXIII, Parts A and C | C. Product from Procedure of Example XXII, Parts A and E | D. Product from Procedure of Example XXXI, Parts A and B |
|---|---|---|---|---|
| 1 | 3,4,5-trimethylpyrazole | Bis[dihydrobis(3,4,5-trimethylpyrazol-1-yl)borate]iron(II). | Bis[hydrotris(3,4,5-trimethylpyrazol-1-yl)borate]cobalt(II). | Bis[tetrakis(3,4,5-trimethylpyrazol-1-yl)borate]nickel(II). |
| 2 | 3-ethylpyrazole | Bis[dihydrobis(3-ethylpyrazol-1-yl)borate]iron(II). | Bis[hydrotris(3-ethylpyrazol-1-yl)borate]cobalt(II). | Bis[tetrakis(3-ethylpyrazol-1-yl)borate]nickel(II). |
| 3 | 3-ethynylpyrazole | Bis[dihydrobis(3-ethynylpyrazol-1-yl)borate]iron(II). | Bis[hydrotris(3-ethynylpyrazol-1-yl)borate]cobalt(II). | Bis[tetrakis(3-ethynylpyrazol-1-yl)borate]nickel(II). |
| 4 | 3-butadienylpyrazole | Bis[dihydrobis(3-butadienylpyrazol-1-yl)borate]iron(II). | Bis[hydrotris(3-butadienylpyrozol-1-yl)borate]cobalt(II). | Bis[tetrakis(3-butadienylpyrazol-1-yl)borate]nickel(II). |
| 5 | 3-methyl-5-phenylpyrazole. | Bis[dihydrobis(3-methyl-5-phenylpyrazol-1-yl)borate]iron(II). | Bis[hydrotris(3-methyl-5-phenylpyrazol-1-yl)borate]cobalt(II). | Bis[tetrakis(3-methyl-5-phenylpyrazol-1-yl)borate]nickel(II). |
| 6 | 3,4,5-triphenylpyrazole | Bis[dihydrobis(3,4,5-triphenylpyrazol-1-yl)borate]iron(II). | Bis[hydrotris(3,4,5-triphenylpyrazol-1-yl)borate]cobalt(II). | Bis[tetrakis(3,4,5-triphenylpyrazol-1-yl)borate]nickel(II). |
| 7 | 5-chloro-3-methylpyrazole. | Bis[dihydrobis(5-chloro-3-methylpyrazol-1-yl)borate]iron(II). | Bis[hydrotris(5-chloro-3-methylpyrazol-1-yl)borate]cobalt(II). | Bis[tetrakis(5-chloro-3-methylpyrazol-1-yl)borate]nickel(II). |
| 8 | 3-bromo-4-phenylpyrazole. | Bis[dihydrobis(3-bromo-4-phenylpyrazol-1-yl)borate]iron(II). | Bis[hydrotris(3-bromo-4-phenylpyrazol-1-yl)borate]cobalt(II). | Bis[tetrakis(3-bromo-4-phenylpyrazol-1-yl)borate]nickel(II). |
| 9 | 4-iodopyrazole | Bis[dihydrobis(4-iodopyrazol-1-yl)borate]iron(II). | Bis[hydrotris(4-iodopyrazol-1-yl)borate]cobalt(II). | Bis[tetrakis(4-iodopyrazol-1-yl)borate]nickel(II). |
| 10 | 3,5-dimethyl-4-nitrosopyrazole. | Bis[dihydrobis(3,5-dimethyl-4-nitrosopyrazol-1-yl)borate]iron(II). | Bis[hydrotris(3,5-dimethyl-4-nitrosopyrazol-1-yl)borate]cobalt(II). | Bis[tetrakis(3,5-dimethyl-4-nitrosopyrazol-1-yl)borate]nickel(II). |
| 11 | 3,5-dimethyl-4-nitropyrazole. | Bis[dihydrobis(3,5-dimethyl-4-nitropyrazol-1-yl)borate]iron(II). | Bis[hydrotris(3,5-dimethyl-4-nitropyrazol-1-yl)borate]cobalt(II). | Bis[tetrakis(3,5-dimethyl-4-nitropyrazol-1-yl)borate]nickel(II). |
| 12 | 3-amino-5-methyl-4-nitropyrazole. | Bis[dihydrobis(3-amino-5-methyl-4-nitropyrazol-1-yl)borate]iron(II). | Bis[hydrotris(3-amino-5-methyl-4-nitropyrazol-1-yl)borate]cobalt-(II). | Bis[tetrakis(3-amino-5-methyl-4-nitropyrazol-1-yl)borate]nickel-(II). |
| 13 | 3-amino-4-bromo-5-methylpyrazole. | Bis[dihydrobis(3-amino-4-bromo-5-methylpyrazol-1-yl)borate]iron-(II). | Bis[hydrotris(3-amino-4-bromo-5-methylpyrazol-1-yl)borate]cobalt-(II). | Bis[tetrakis(3-amino-4-bromo-5-methylpyrazol-1-yl)borate]nickel(II). |
| 14 | 3-anilino-5-phenylpyrazole. | Bis[dihydrobis(3-anilino-5-phenylpyrazol-1-yl)borate]iron(II). | Bis[hydrotris(3-anilino-5-phenylpyrazol-1-yl)borate]cobalt(II). | Bis[tetrakis(3-anilino-5-phenylpyrazol-1-yl)borate]nickel(II). |
| 15 | 4-hydroxy-3-methyl-5-phenylpyrazole. | Bis[dihydrobis(4-hydroxy-3-methyl-5-phenylpyrazol-1-yl)borate]iron-(II). | Bis[hydrotris(4-hydroxy-3-methyl-5-phenylpyrazol-1-yl)borate]cobalt(II). | Bis[tetrakis(4-hydroxy-3-methyl-5-phenylpyrazol-1-yl)borate]nickel(II). |
| 16 | 3-methoxy-5-methylpyrazole. | Bis[dihydrobis(3-methoxy-5-methylpyrazol-1-yl)borate]iron(II). | Bis[hydrotris(3-methoxy-5-methylpyrazol-1-yl)borate]cobalt(II). | Bis[tetrakis(3-methoxy-5-methylpyrazol-1-yl)borate]nickel(II). |
| 17 | 4-hydroxymethylpyrazole. | Bis[dihydrobis(4-hydroxymethylpyrazol-1-yl)borate]iron(II). | Bis[hydrotris(4-hydroxymethylpyrazol-1-yl)borate]cobalt(II). | Bis[tetrakis(4-hydroxymethylpyrazol-1-yl)borate]nickel(II). |

| Item | A. Substituted Pyrazole | B. Product from Procedure of Example XXIII, Parts A and C | C. Product from Procedure of Example XXII, Parts A and E | D. Product from Procedure of Example XXXI, Parts A and B |
|---|---|---|---|---|
| 18 | 4-aminoethylpyrazole | Bis[dihydrobis(4-β-aminoethylpyrazol-1-yl)borate]iron(II). | Bis[hydrotris(4-β-aminoethylpyrazol-1-yl)borate]cobalt(II). | Bis[tetrakis(4-β-aminoethylpyrazol-1-yl)borate]nickel(II). |
| 19 | 4,5-diformylpyrazole | Bis[dihydrobis(4,5-diformylpyrazol-1-yl)borate]iron(II). | Bis[hydrotris(4,5-diformylpyrazol-1-yl)borate]cobalt(II). | Bis[tetrakis(4,5-diformylpyrazol-1-yl)borate]nickel(II). |
| 20 | 3-benzoylpyrazole | Bis[dihydrobis(3-benzoylpyrazol-1-yl)borate]iron(II). | Bis[hydrotris(3-benzoylpyrazol-1-yl)borate]cobalt(II). | Bis[tetrakis(3-benzoylpyrazol-1-yl)borate]nickel(II). |
| 21 | 3,5-diacetyl-4-phenylpyrazole. | Bis[dihydrobis(3,5-diacetyl-4-phenylpyrazol-1-yl)borate]iron(II). | Bis[hydrotris(3,5-diacetyl-4-phenylpyrazol-1-yl)borate]cobalt(II). | Bis[tetrakis(3,5-diacetyl-4-phenylpyrazol-1-yl)borate]nickel(II). |
| 22 | 3-carboxy-5-methylpyrazole. | Bis[dihydrobis(3-carboxy-5-methylpyrazol-1-yl)borate]iron(II). | Bis[hydrotris(3-carboxy-5-methylpyrazol-1-yl)borate]cobalt(II). | Bis[tetrakis(3-carboxy-5-methylpyrazol-1-yl)borate]nickel(II). |
| 23 | 3,4,5-tricarboxypyrazole | Bis[dihydrobis(3,4,5-tricarboxypyrazol-1-yl)borate]iron(II). | Bis[hydrotris(3,4,5-tricarboxypyrazol-1-yl)borate]cobalt(II). | Bis[tetrakis(3,4,5-tricarboxypyrazol-1-yl)borate]nickel(II). |
| 24 | 4-amino-3-carboxy-5-methylpyrazole. | Bis[dihydrobis(4-amino-3-carboxy-5-methylpyrazol-1-yl)borate]iron(II). | Bis[hydrotris(4-amino-3-carboxy-5-methylpyrazol-1-yl)borate]cobalt(II). | Bis[tetrakis(4-amino-3-carboxy-5-methylpyrazol-1-yl)borate]nickel(II). |
| 25 | 3-benzyl-5-carboxy-4-hydroxypyrazole. | Bis[dihydrobis(3-benzyl-5-carboxy-4-hydroxypyrazol-1-yl)borate]iron(II). | Bis[hydrotris(3-benzyl-5-carboxy-4-hydroxypyrazol-1-yl)borate]cobalt(II). | Bis[tetrakis(3-benzyl-5-carboxy-4-hydroxypyrazol-1-yl)borate]nickel(II). |
| 26 | 3-carboxymethylpyrazole | Bis[dihydrobis(3-carboxymethylpyrazol-1-yl)borate]iron(II). | Bis[hydrotris(3-carboxymethylpyrazol-1-yl)borate]cobalt(II). | Bis[tetrakis(3-carboxymethylpyrazol-1-yl)borate]nickel(II). |
| 27 | 3-methylindazole (i.e., 3-methylbenzopyrazole). | Bis[dihydrobis(3-methylindazol-1-yl)borate]iron(II). | Bis[hydrotris(3-methylindazol-1-yl)borate]cobalt(II). | Bis[tetrakis(3-methylindazol-1-yl)borate]nickel(II). |
| 28 | 5,7-dimethylindazole | Bis[dihydrobis(5,7-dimethylindazol-1-yl)borate]iron(II). | Bis[hydrotris(5,7-dimethylindazol-1-yl)borate]cobalt(II). | Bis[tetrakis(5,7-dimethylindazol-1-yl)borate]nickel(II). |
| 29 | 3,5-dichloroindazole | Bis[dihydrobis(3,5-dichloroindazol-1-yl)borate]iron(II). | Bis[hydrotris(3,5-dichloroindazol-1-yl)borate]cobalt(II). | Bis[tetrakis(3,5-dichloroindazol-1-yl)borate]nickel(II). |
| 30 | 5,6-diaminoindazole | Bis[dihydrobis(5,6-diaminoindazol-1-yl)borate]iron(II). | Bis[hydrotris(5,6-diaminoindazol-1-yl)borate]cobalt(II). | Bis[tetrakis(5,6-diaminoindazol-1-yl)borate]nickel(II). |
| 31 | 5,6-dihydroxyindazole | Bis[dihydrobis(5,6-dihydroxyindazol-1-yl)borate]iron(II). | Bis[hydrotris(5,6-dihydroxyindazol-1-yl)borate]cobalt(II). | Bis[tetrakis(5,6-dihydroxyindazol-1-yl)borate]nickel(II). |
| 32 | 3-acetylindazole | Bis[dihydrobis(3-acetylindazol-1-yl)borate]iron(II). | Bis[hydrotris(3-acetylindazol-1-yl)borate]cobalt(II). | Bis[tetrakis(3-acetylindazol-1-yl)borate]nickel(II). |
| 33 | 3-cyanoindazole | Bis[dihydrobis(3-cyanoindazol-1-yl)borate]iron(II). | Bis[hydrotris(3-cyanoindazol-1-yl)borate]cobalt(II). | Bis[tetrakis(3-cyanoindazol-1-yl)borate]nickel(II). |
| 34 | 3-dimethylaminomethylindazole. | Bis[dihydrobis(3-dimethylaminomethylindazol-1-yl)borate]iron(II). | Bis[hydrotris(3-dimethylaminomethylindazol-1-yl)borate]cobalt(II). | Bis[tetrakis(3-dimethylaminomethylindazol-1-yl)borate]nickel(II). |
| 35 | 3,4-cyclotetramethylenepyrazole. | Bis[dihydrobis(3,4-cyclotetramethylenepyrazol-1-yl)borate]iron(II). | Bis[hydrotris(3,4-cyclotetramethylenepyrazol-1-yl)borate]cobalt(II). | Bis[tetrakis(3,4-cyclotetramethylenepyrazol-1-yl)borate]nickel(II). |
| 36 | Benz[f]indazole (i.e., naphtho[2,3-c]pyrazole). | Bis[dihydrobis(benz[f]indazol-1-yl)borate]iron(II). | Bis[hydrotris(benz[f]indazol-1-yl)borate]cobalt(II). | Bis[tetrakis(benz[f]indazol-1-yl)borate]nickel(II). |

When the triazoles shown in column A of Table II are used in place of 1,2,4-triazole in the procedure of Example XXIX, the nickel chelates shown in column B are obtained.

TABLE II

| Item | A. Triazole | B. Product from Procedure of Example XXIX |
|---|---|---|
| 1 | 4,5-dimethyl-(1,2,3-triazole. | Bis[hydrotris(4,5-dimethyl-1,2,3-triazol-1-yl)borate]nickel(II). |
| 2 | 5-hydroxy-4-methoxycarbonyl-1,2,3-triazole. | Bis[hydrotris(5-hydroxy-4-methoxycarbonyl-1,2,3-triazol-1-yl)borate]nickel(II). |
| 3 | 4-anilino-5-ethoxycarbonyl-1,2,3-triazole. | Bis[hydrotris(4-anilino-5-ethoxycarbonyl-1,2,3-triazol-1-yl)borate]nickel(II). |
| 4 | 4-carboxy-5-phenyl-1,2,3-triazole. | Bis[hydrotris(4-carboxy-5-phenyl-1,2,3-triazol-1-yl)borate]nickel(II). |
| 5 | 5-methylbenzotriazole | Bis[hydrotris(5-methylbenzotriazol-1-yl)borate]nickel(II). |
| 6 | Naphtho(1,2-d)triazole. | Bis[hydrotris(naphtho(1,2-d)-triazol-1-yl)borate]nickel(II). |
| 7 | 3-chloro-5-methyl-1,2,4-triazole. | Bis[hydrotris(3-chloro-5-methyl-1,2,4-triazol-1-yl)borate]nickel(II). |
| 8 | 3-hydroxy-5-phenyl-1,2,4-triazole. | Bis[hydrotris(3-hydroxy-5-phenyl-1,2,4-triazol-1-yl)-borate]nickel(II). |
| 9 | 3,5-dimercapto-1,2,4-triazole. | Bis[hydrotris(3,5-dimercapto-1,2,4-triazol-1-yl)borate]-nickel(II). |
| 10 | 3-amino-5-carboxy-1,2,4-triazole. | Bis[hydrotris(3-amino-5-carboxy-1,2,4-triazol-1-yl)borate]-nickel(II). |

When the tetrazoles shown in column A of Table III are used in place of 1,2,3-triazole in the procedure of Example XXX, the nickel chelates shown in column B are obtained.

TABLE III

| Item | A. Tetrazole | B. Product from Procedure of Example XXX |
|---|---|---|
| 1 | Tetrazole | Bis[hydrotris(tetrazol-1-yl)borate]nickel(II). |
| 2 | Phenyltetrazole | Bis[hydrotris(phenyltetrazol-1-yl)borate]nickel(II). |
| 3 | Trifluoromethyltetrazole. | Bis[hydrotris(trifluoromethyltetrazol-1-yl)borate]nickel(II). |
| 4 | Methylthiotetrazole. | Bis[hydrotris(methylthiotetrazol-1-yl)borate]nickel(II). |
| 5 | Ethoxycarbonyltetrazole. | Bis[hydrotris(ethoxycarbonyltetrazol-1-yl)borate]nickel(II). |

When the procedure of Example XV is repeated using in place of $KBH_4$ the other borohydride compounds shown in column A of Table IV, the indicated crystalline products are obtained.

TABLE IV

| Item | A. Borohydride Compound | B. Product from Procedure of Example XV |
|---|---|---|
| 1 | $(CH_3)_4NBH_4$ | Tetramethylammonium hydrotri-1-pyrazolylborate. |
| 2 | $(C_2H_5)_4NBH_4$ | Tetraethylammonium hydrotri-1-pyrazolylborate. |
| 3 | $(C_3H_7)_4NBH_4$ | Tetrapropylammonium hydrotri-1-pyrazolylborate. |
| 4 | $(C_8H_{17})_3NCH_3BH_4$ | Methyltrioctylammonium hydrotri-1-pyrazolylborate. |
| 5 | $C_{16}H_{33}N(CH_3)_3BH_4$ | Hexadecyltrimethylammonium hydrotri-1-pyrazolylborate. |
| 6 | $LiBH_3CN$ | Lithium cyanotri-1-pyrazolylborate. |
| 7 | $NaBH_4$ | Sodium hydrotri-1-pyrazolylborate. |

In another process for preparing the products of this invention, compounds of the formula RB(OH)$_2$ (column A of Table V) where R is as defined above are treated with PCl$_5$ to obtain the corresponding compound RBCl$_2$. This intermediate is then treated with pyrazole and then with aqueous Co(OAc)$_2$ in the manner of Example XXXII to obtain the cobalt chelate product indicated in column B of Table V.

TABLE V

| Item | A. RB(OH)$_2$ Starting Compound | B. Product from Procedure of Example XXXII |
|---|---|---|
| 1 | C$_4$H$_9$B(OH)$_2$ | Bis(butyltri-1-pyrazolylborate)cobalt(II). |
| 2 | C$_6$H$_{11}$B(OH)$_2$ | Bis(cyclohexyltri-1-pyrazolylborate)cobalt (II). |
| 3 | C$_9$H$_{19}$B(OH)$_2$ | Bis(nonyltri-1-pyrazolylborate)cobalt(II). |
| 4 | C$_{18}$H$_{37}$B(OH)$_2$ | Bis(octadecyltri-1-pyrazolylborate)cobalt (II). |

When the salts indicated in column A of Table VI are substituted for CaCl$_2$ in the metathesis procedure of Example XXI, the metal compounds shown in column B of Table VI are obtained.

TABLE VI

| Item | A. Metal salt | B. Product from Procedure of Example XXI |
|---|---|---|
| 1 | BeCl$_2$ | Bis(tetra-1-pyrazolylborate)beryllium(II). |
| 2 | MgCl$_2$ | Bis(tetra-1-pyrazolylborate)magnesium(II). |
| 3 | VCl$_2$ | Bis(tetra-1-pyrazolylborate)vanadium(II). |
| 4 | CrCl$_2$ | Bis(tetra-1-pyrazolylborate)chromium(II). |
| 5 | RbCl | Rubidium tetra-1-pyrazolylborate. |
| 6 | SrCl$_2$ | Bis(tetra-1-pyrazolylborate)strontium(II). |
| 7 | MoI$_2$ | Bis(tetra-1-pyrazolylborate)molybdenum(II). |
| 8 | RuCl$_2$ | Bis(tetra-1-pyrazolylborate)ruthenium(II). |
| 9 | AgNO$_3$ | Silver tetra-1-pyrazolylborate. |
| 10 | CdCl$_2$ | Bis(tetra-1-pyrazolylborate)cadmium(II). |
| 11 | SnCl$_2$ | Bis(tetra-1-pyrazolylborate)tin(II). |
| 12 | CsCl | Cesium tetra-1-pyrazolylborate. |
| 13 | BaCl$_2$ | Bis(tetra-1-pyrazolylborate)barium(II). |
| 14 | SmCl$_2$ | Bis(tetra-1-pyrazolylborate)samarium(II). |
| 15 | OsCl$_2$ | Bis(tetra-1-pyrazolylborate)osmium(II). |
| 16 | IrCl$_2$ | Bis(tetra-1-pyrazolylborate)iridium(II). |
| 17 | AuCl | Gold tetra-1-pyrazolylborate. |
| 18 | HgCl$_2$ | Bis(tetra-1-pyrazolylborate)mercury(II). |
| 19 | RaBr$_2$ | Bis(tetra-1-pyrazolylborate)radium(II). |

Other compounds of this invention are prepared by procedures similar to the above. For example, in place of the unsymmetrically substituted 1H-pyrazoles in Table I, the corresponding 2H-pyrazoles may be employed to yield the corresponding pyrazol-2-yl products. In a similar manner, 2H- and 3H-triazoles in place of the 1H-triazoles shown in Table II yield the corresponding 1,2,3,-triazol-2-yl and 1,2,3-triazol-3-yl products. Similarly, 2H-tetrazoles in place of the 1H-tetrazoles shown in Table III yield the corresponding tetrazol-2-yl products.

By employing LiGaH$_4$ in place of KBH$_4$ or LiAlH$_4$ in the examples above, the corresponding gallates are obtained. For example, when LiGaH$_4$ is employed in place of LiAlH$_4$ in the procedure of Example XVII, lithium tetra-1-pyrazolyl-gallate is obtained. The use of LiGaH$_4$ in place of KBH$_4$ in the procedure of Example X yields bis (dihydrodi-1-pyrazolylgallate)nickel (II).

Still other compounds of this invention are prepared by employing InCl$_3$ and TlCl$_3$ in place of BCl$_3$ in Examples I, II, and III. For example, when InCl$_3$ is employed in place of BCl$_3$ in Example I, there is obtained (tetra-1-pyrazolylindate)iron (III) dichloride. The corresponding thallates are similarly prepared. For example, when TlCl$_3$ is used in place of BCl$_3$ in the procedure of Example II, Parts A and B, bis(tetra-1-pyrazolylthallate)iron (II) is obtained.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the formula

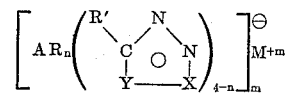

wherein A is an element of Group III–A of the Periodic Table; R is a member of the class consisting of hydrogen, alkyl containing up to 18 carbon atoms, phenyl and cyano; X is a member of the class consisting of N and C—R″; Y is a member of the class consisting of N and C—R‴; R′, R″ and R‴ each represents a member of the class consisting of hydrogen, hydroxy, mercapto, cyano, nitro, nitroso, carboxy, loweralkyl, phenyl, halogen, trifluoromethyl, amino, formyl, loweralkylcarbonyl, benzoyl, loweralkoxy, loweralkoxycarbonyl, loweralkylmercapto, hydroxyloweralkyl, aminoloweralkyl and carboxyloweralkyl with the proviso that any two of R′, R″ and R‴ on adjacent carbon atoms may be taken together to form, with the two carbons to which they are attached, an aryl system on the nitrogen containing ring to which they are attached, said aryl system being a member of the class consisting of a benzo system and a naphtho system; $n$ is an integer from 0–2, inclusive; $m$ is an integer from 1–2, inclusive, equal to the net positive charge on M; and M is a cation selected from the class consisting of hydrogen, ammonium, alkylammonium containing up to 18 carbon atoms, phenylammonium, loweralkylsulfonium and metals having a net positive valence of 1–2, inclusive.

2. A compound as defined by claim 1 wherein A is boron, X is C—R″; Y is C—R‴; and R, R′, R″, R‴ and M each represents hydrogen.

3. A compound as defined by claim 1 wherein A is boron, X is C—R″; Y is C—R‴; R represents C$_1$—C$_{18}$ alkyl; and R′, R″ and R‴ each represent loweralkyl; and M represents ammonium.

4. A compound as defined by claim 1 wherein A is boron; X is C—R″; Y is C—R‴; R, R′, R″ and R‴ each represents phenyl; and M represents a metal ion.

5. A compound as defined by claim 1 wherein A is aluminum; X is N; Y is C—R‴; and R, R′, R‴ and M each represents hydrogen.

6. A compound as defined by claim 1 wherein A is aluminum; X is N; Y is C—R‴; R, R′ and R‴ each represents loweralkyl; and M represents ammonium.

7. A compound as defined by claim 1 wherein A is aluminum; X is N; Y is C—R‴; R, R′ and R‴ each represents phenyl; and M represents a metal ion.

8. A compound as defined by claim 1 wherein A is boron; R is lower alkyl; X is C—R″; Y is C—R‴; R′, R″ and R‴ each represents hydrogen; and M represents a transition metal ion.

9. A compound as defined by claim 1 wherein A is boron; R is hydrogen; X is C—R″; Y is C—R‴; R′, R″ and R‴ each represents lower alkyl; and M represents a transition metal ion.

10. Bis(tetra-1-pyrazolylborate)M(II) wherein M represents a transition metal.

11. Bis(hydrotri-1-pyrazolylborate)M(II) wherein M represents a transition metal.

12. Bis(dihydrodi-1-pyrazolylborate)M(II) wherein M represents a transition metal.

13. Pyrazolonium tetra-1-pyrazolylborate.

14. Potassium tetra-1-pyrazolylborate monohydrate.

15. A compound as defined by claim 10 wherein M represents iron.

16. A compound as defined by claim 11 wherein M represents cobalt.

17. A compound as defined by claim 12 wherein M represents nickel.

18. A compound as defined by claim 10 wherein M represents copper.

19. Process which comprises heating stepwise a mixture of a compound selected from the class consisting of pyrazoles, triazoles and tetrazoles and a compound of the formula $MAR_4$ wherein M is a cation selected from the class consisting of hydrogen, ammonium, alkylammonium containing up to 18 carbon atoms, phenylammonium; loweralkylsulfonium and metals having a net positive valence of 1–2, inclusive; A is an element of Group III–A of the Periodic Table; and R is a member of the class consisting of hydrogen, alkyl containing up to 18 carbon atoms, phenyl and cyano.

20. The process as defined by claim 19 wherein said heating steps take place at temperatures in the range 90° C. to 110° C., 180° C. to 220° C., and 260° C. to 290° C.

References Cited by the Applicant

E. Buchner and M. Fritsch, Ann., 273, 260 (1893).
E. Buchner, Ber. 22, 2166 (1889).
F. Umland and D. Thierig, Angew. Chem., 685 (1963).
G. N. Schrauzer, Ber. 95, 1438 (1962).
H. B. Hill and O. F. Black, Am. Chem. J., 33, 298 (1905).
J. K. Ruff, J. Am. Chem. Soc., 83, 2835 (1961).
P. T. Lansbury and J. O. Peterson, J. Am. Chem. Soc., 85, 2236, (1962).
V. A. Sazonova and V. I. Karpov, Zhur, Obshchei Khim., 33, 3313 (1963).

HENRY R. JILES, *Acting Primary Examiner.*

R. J. GALLAGHER, *Assistant Examiner.*

UNITED STATES PATENT OFFICE
CERTIFICATE OF CORRECTION

Patent No. 3,261,844                                      July 19, 1966

Swiatoslaw Trofimenko

It is hereby certified that error appears in the above numbered patent requiring correction and that the said Letters Patent should read as corrected below.

Column 2, lines 28 to 33, the formula should appear as shown below instead of as in the patent:

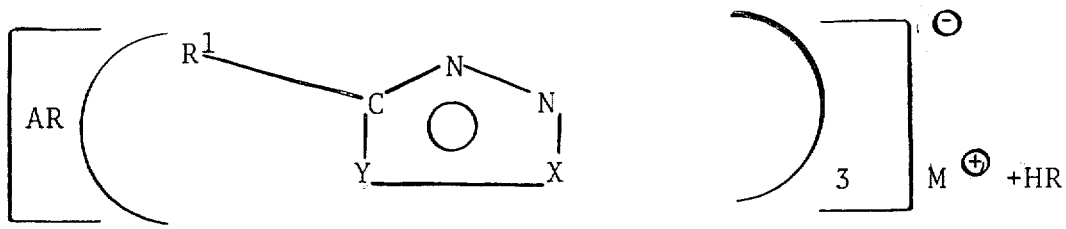

column 4, line 64, for "cobalt (III)" read -- cobalt (II) --; column 7, lines 60 and 61, for "copper" read -- copper(II) --; column 11, line 71, for "covered" read -- colored --; columns 13 and 14, TABLE I, column 3, line 3 thereof, for "dihydrois" read -- dihydrobis --; columns 15 and 16, TABLE I continued, column 2, line 1 thereof, for "4-_-aminoethylpyrazole" read -- 4-β-aminoethylpyrazole --; column 18, line 51, for "R is lower alkyl; X is C-R″; Y is C-R‴; R, R″" read -- R is lower alkyl; X is C-R″ ; Y is C-R‴ ; R′, R″ --.

Signed and sealed this 1st day of August 1967.

(SEAL)
Attest:

EDWARD M. FLETCHER, JR.                              EDWARD J. BRENNER
Attesting Officer                                            Commissioner of Patents